(12) United States Patent
Deppert et al.

(10) Patent No.: US 9,862,851 B2
(45) Date of Patent: Jan. 9, 2018

(54) COATINGS FOR ZINC SULFIDE OPTICS

(71) Applicant: Raytheon Company, Waltham, MA (US)

(72) Inventors: Thomas M. Deppert, Gilbert, AZ (US); David R. Smith, Tucson, AZ (US); Amanda Gravanda, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 160 days.

(21) Appl. No.: 14/940,409

(22) Filed: Nov. 13, 2015

(65) Prior Publication Data

US 2017/0137657 A1 May 18, 2017

(51) Int. Cl.

| C09D 123/20 | (2006.01) |
|---|---|
| C09D 145/00 | (2006.01) |
| C09D 123/06 | (2006.01) |
| C09D 123/12 | (2006.01) |
| C09D 147/00 | (2006.01) |

(52) U.S. Cl.
CPC ......... *C09D 123/20* (2013.01); *C09D 123/06* (2013.01); *C09D 123/12* (2013.01); *C09D 145/00* (2013.01); *C09D 147/00* (2013.01)

(58) Field of Classification Search
CPC .. C09D 123/06; C09D 123/12; C09D 123/20; C09D 145/00; C09D 147/00
See application file for complete search history.

(56) References Cited

U.S. PATENT DOCUMENTS

| 5,324,586 A * | 6/1994 | Klocek ................. G02B 1/105 428/412 |
| 2001/0038925 A1* | 11/2001 | Barton ................. C09K 11/025 428/690 |
| 2007/0221947 A1 | 9/2007 | Locascio et al. |
| 2012/0205540 A1* | 8/2012 | Ravichandran ........ B82Y 20/00 250/330 |
| 2016/0159968 A1* | 6/2016 | Deppert ............. C08G 59/1494 525/523 |

FOREIGN PATENT DOCUMENTS

WO 2016093931 A1 6/2016

OTHER PUBLICATIONS

Rasberry et al. (Journal of Materials Chemistry 2011, 21, 13902-13908).*
"Reactions of Alkenes: Addition Reactions of Alkenes"; Michigan State University; retrieved on Nov. 10, 2015 from https://www2.chemistry.msu.edu/faculty/reusch/VirtTxtJml/addene1.htm; p. 1-8; May 5, 2013.

(Continued)

*Primary Examiner* — Vu A Nguyen
(74) *Attorney, Agent, or Firm* — Cantor Colburn LLP

(57) ABSTRACT

A optical element includes a surface including a zinc sulfide layer; a coupling agent adhered to the zinc sulfide layer by a disulfide bond and including a hydrocarbon tail extending from the disulfide bond; and a polymer bonded to the hydrocarbon tail of the coupling agent by a covalent bond; wherein the polymer and the coupling agent are optically transparent in the long wavelength infrared (LWIR) region.

20 Claims, 2 Drawing Sheets

(56) References Cited

OTHER PUBLICATIONS

"Zinc: Zinc Sulphide"; WebElements; p. 1-7; retrieved on Nov. 13, 2015 from http://www.webelements.com/compounds/zinc/zinc_sulphide.html; 1993-2015.
Deppert, Thomas M., et al.; "Substantivity of Dyes and Surfactants Containing Isothiuronium Groups to Hair"; J. Soc. Cosmet. Chem.; vol. 42; p. 1-17; Jan./Feb. 1991.
Deppert, Thomas M., et al.; "Zinc Sulfide Coupling Agents"; U.S. Appl. No. 14/563,371; filed Dec. 8, 2014.
Harris, Daniel C.; "Multi-Spectral Transparent Materials Technologies"; American Ceramic Society; p. 1-40; Jun. 2010.
McCloy, John S.; "Properties and Processing of Chemical Vapor Deposited Zinc Sulfide"; ProQuest; p. 1-381; 2008.
Rasberry, Roger D., et al.; "Low Loss Photopatternable Matsrix Materials for LWIR-Metamaterial Applications"; Journal of Materials Chemistry; vol. 21; p. 13902-13908; 2011.
Anonymous: "Infrared—Wikipedia", published Nov. 13, 2016, retrieved from the Internet: URL:https://en.wikipedia.org/wiki/Infrared, pp. 1-12.
Authors et al.: Disclosed Anonymously, "Isothiouronium—Wikipedia, the free encyclopedia," Retrieved from the Internet: URL: "https://en.wikipedia.org/w/index.php?titlle=Isothiouronium . . . " Feb. 15, 2017, pp. 1-2.
International Search Report and Written Opinion dated Nov. 24, 2016 for Application No. PCT/US2016/050524.
Paek et al., "Fluorescent and pH-responsive diblock copolymer-coated core-shell CdSe/ZnS particles for a color-displaying, ratiometric pH sensor", Chemical Communications—Chemcom, vol. 47, Jan. 1, 2011, pp. 10272-10274.
Tetsuo Uyeda et al., "Synthesis of Compact Multidentate Ligands to Prepare Stable Jydrophilic Quantum Dot Fluorophores," Journal of the American Chemical Society, (Mar. 1, 2005), Published on Web Feb. 26, 2005, pp. 3870-3878.
Zhu, et al., "Synthesis and Optical Properties of Thiol Functionalized CdSe/ZnS (Core/Shell) Quantum Dots by Ligand Exchange", Journal of Nanomaterials, Published Mar. 20, 2014, pp. 1-14.

\* cited by examiner

COATINGS FOR ZINC SULFIDE OPTICS

BACKGROUND

The present disclosure relates to optics, more specifically to zinc sulfide-containing optical elements.

Zinc sulfide is a durable material that is intrinsically transparent to relatively long electromagnetic wavelengths in the far-infrared (IR) range. Such properties contribute to its use in applications that need IR transmission capability, such as in IR detectors and missile domes.

For some applications, the performance of zinc sulfide optical elements may be improved by coating or treating the zinc sulfide with organic polymers. However, due to the fundamental chemical differences between the ionic salt-like structure of the zinc sulfide and the non-polar nature of the polymers, the organic polymers may poorly adhere to the zinc sulfide surfaces. These differences in the chemical nature of the two materials may result in poor wetting of the zinc sulfide and lead to poor adhesion.

In other systems, adhesion promoters or primers may be used to couple the organic polymers to the inorganic surfaces. For example, in glasses, silanes may be used as such a promoter/primer.

SUMMARY

According to one embodiment, an optical element includes a surface including a zinc sulfide layer; a coupling agent adhered to the zinc sulfide layer by a disulfide bond and including a hydrocarbon tail extending from the disulfide bond; and a polymer bonded to the hydrocarbon tail of the coupling agent by a covalent bond; wherein the polymer and the coupling agent are optically transparent in the long wavelength infrared (LWIR) region.

According to another embodiment, an optical element includes a surface including a zinc sulfide layer; a coupling agent bonded to the zinc sulfide layer by a disulfide bond and including a saturated hydrocarbon tail with about 2 to about 20 carbons extending from the disulfide bond; and a polymer bonded to the hydrocarbon tail of the coupling agent by a covalent bond; wherein the polymer and the coupling agent are optically transparent in the long wavelength infrared (LWIR) region of about 8 to about 12 microns.

Yet, according to another embodiment, a method of making an optical element includes forming a surface including a zinc sulfide layer; bonding a coupling agent to the zinc sulfide layer by a disulfide bond, the coupling agent including a hydrocarbon tail extending from the disulfide bond; and bonding a polymer to the hydrocarbon tail of the coupling agent to form a coating that is optically transparent in the long wavelength infrared (LWIR) region of about 8 to about 12 microns.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
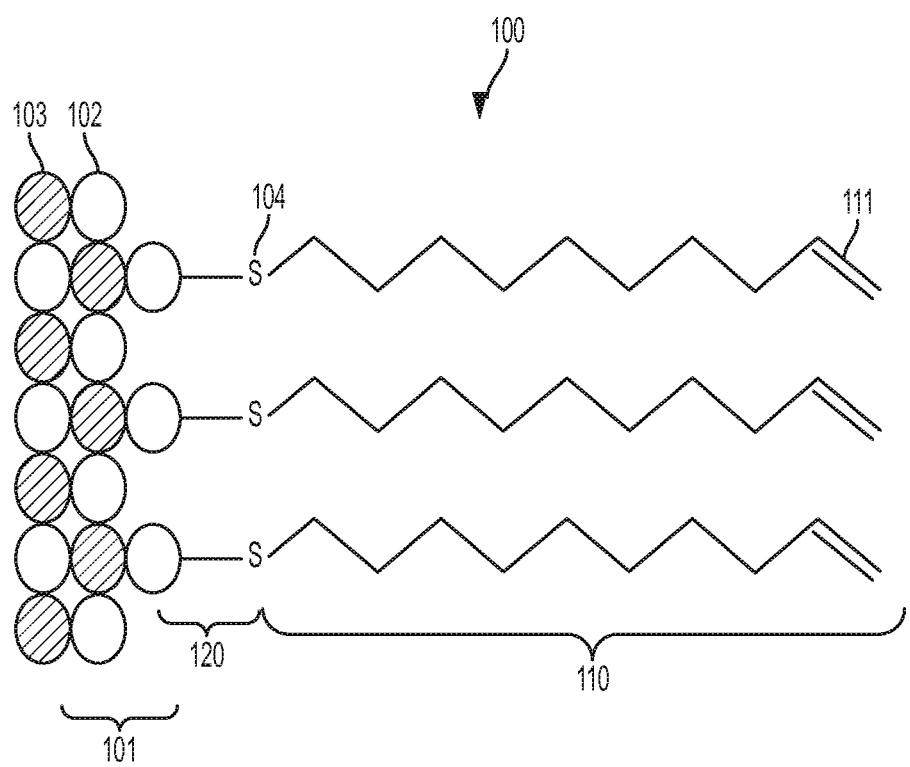
FIG. 1 is a schematic diagram of a coupling agent covalently bonded to a zinc sulfide surface.

Zinc sulfide is used to make a variety of optical elements and has excellent transmission properties in the infrared spectrum. However, the chemical structure at the surface of zinc sulfide may result in poor adhesion to organic polymers and coatings. Although zinc sulfide coupling agents may form disulfide bonds with the sulfur functional groups that extend from the zinc sulfide surfaces, they may not be transparent in the IR region when the functional group that couples to the polymer includes certain functional groups (e.g., oxygen-containing functional groups such as alcohols, carboxylic acids, esters, and ethers; nitrogen-containing functional groups such as amines, and alkyl halides), which may limit its use on optical elements.

Accordingly, disclosed herein is a coating that includes a coupling agent that forms a disulfide bond with the zinc sulfide surface and includes a hydrocarbon compound functional group that covalently bonds with the organic polymer. Hydrocarbon functional groups do not absorb in the long wavelength IR (LWIR) region of interest. The coating is thus an adhesion promoter that is transparent in the LWIR region.

The coatings can be paired with a variety of optical surfaces. For example, the coatings can be used on lenses, optical windows, sensors, detectors, domes, beam splitters, and other like optical surfaces. The coatings improve the mechanical properties and stability of transparent zinc sulfide. The coatings also protect the zinc sulfide from handling damage and do not interfere with the optical properties.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e. occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 9, 8, 7, 6, 5, 4, 3, 2, or 1% of the reported numerical value.

Turning now to the figures, FIG. 1 is a schematic diagram of a zinc sulfide optical element 100. The zinc sulfide optical element 100 includes a zinc sulfide surface 101. The zinc sulfide surface 101 includes an ionic salt-like surface structure that includes zinc 103 and sulfur 102. In some embodiments, the zinc sulfide surface 101 includes zinc (II) sulfide or cubic ZnS (also referred to as sphalerite or zinc blende). The zinc sulfide surface 101 is transparent in the LWIR region.

The zinc sulfide surface 101 may be produced using various deposition processes to deposit zinc sulfide onto a surface. Non-limiting examples of methods for forming the zinc sulfide surface include chemical vapor deposition (CVD), hot pressing techniques, hot-isostatic pressing (HIP) techniques, and other like methods.

The transmission, thermal stability, and strength of the zinc sulfide surface 101 may depend on the substrate upon which the zinc sulfide is deposited. Depending on the substrate used and conditions employed, the zinc sulfide surface 101 may be suitable to withstand conditions encountered by missiles, projectiles, satellites, and related devices. The present disclosure is not limited to any zinc sulfide deposition or forming method, article shape, or application.

Although the zinc sulfide surface 101 is shown as a substantially flat/linear surface in FIG. 1, the zinc sulfide surface 101 may be any shape. In some embodiments, the zinc sulfide surface 101 can be curved, such as concave or convex.

The zinc sulfide optical element 100 includes a coating with a coupling agent 110 covalently bonded to a zinc sulfide surface 101. The coupling agent includes a sulfur 104 on one end. The sulfur 104 may be derived from a thiol, a thiolate, a thioglycolic acid, or a thioglycolic acid salt.

The coupling agent 110 may be covalently bonded to the zinc sulfide surface 101 by disposing the sulfur-containing coupling agent 110 onto the zinc sulfide surface 101. The optimal conditions for forming a disulfide bond 120 with the zinc sulfide surface 101 will depend on the particular coupling agent 110 used. The solvents, temperatures, and reactant concentration can be tailored accordingly. A basic pH and oxidizing conditions may be used to form a reactive thiolate group or a thioglycolic acid salt.

The coupling agent 110 includes a hydrocarbon chain (tail) extending from the sulfur 104. The hydrocarbon chain terminates in an alkene group 111. Although the coupling agent 110 shown in FIG. 1 includes a decene tail (10 carbons), the hydrocarbon chain terminating in the reactive alkene group 111 can include any number of carbons.

In some embodiments, the coupling agent 110 includes a hydrocarbon chain with about 2 to about 20 carbons. In other embodiments, the coupling agent 110 includes a hydrocarbon chain with about 5 to about 15 carbons. Yet, in other embodiments, the coupling agent 110 includes a hydrocarbon chain with about or in any range from about 2, 3, 4, 5, 6, 7, 8, 9, 10, 11, 12, 13, 14, 15, 16, 17, 18, 19, and 20 carbons.

The hydrocarbon chain of the coupling agent 110 may be saturated and include a single, terminal unsaturated double bond, as shown in FIG. 1. The hydrocarbon chain also may also include other unsaturated double bonds. The hydrocarbon chain may include an alkyl chain with the single unsaturated double bond. The hydrocarbon chain also may include an alkenyl chain with more than one double bond.

The coupling agent 110 does not include groups or atoms that absorb and is thus transparent in the LWIR region (8 to 12 microns). The coupling agent does not include, for example, nitrogen groups/atoms, oxygen groups/atoms, or halogen groups/atoms. However, in some embodiments, the coupling agent 110 may include sulfur groups/atoms. The coupling agent 110 may include only carbon and hydrogen.

In one embodiment, the coupling agent 110 may be formed from an isothiouronium salt. Isothiouronium has the general formula: $RSC(NH_2)_2]^+$, wherein R=alkyl, aryl. The hydrogen (H) groups bonded to the nitrogen (N) may be substituted with alkyl or aryl groups.

For example, isothiouronium salts may have the following structure:

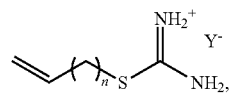

wherein n is an integer from about 2 to 18 and $Y^-$ is an anion that can form a salt with the positively charged isothiouronium group.

Other non-limiting examples of isothiouronium salts include those having the following structure:

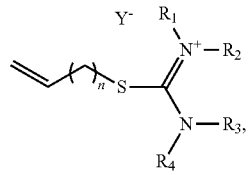

wherein $R_1$, $R_2$, $R_3$, and $R_4$ are each independently a hydrogen, an alkyl chain, an alkenyl chain, an alkynyl chain, or an aryl chain containing any number of carbons, for example from about 1 to about 18, and can be substituted with any functional groups; $Y^-$ is an anion that can form a salt with the isothiouronium group; and n is any integer, for example, from 2 to 18. Non-limiting examples for each of $R_1$, $R_2$, $R_3$, and $R_4$ are methyl groups, ethyl groups, propyl groups, and butyl groups.

Any method may be used to make isothiouronium salts. Scheme 1 below is an exemplary non-limiting method using an $SN_2$ substitution reaction:

Scheme 1

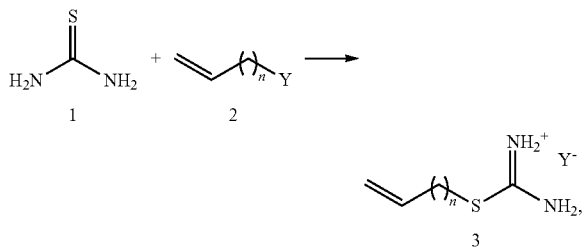

wherein n is any integer, for example between 2 and 18; and Y is a leaving group that can be replaced in an $SN_2$ substitution reaction. As shown, thiourea (1) reacts with alkene compound (2) having the formula: $CH_2(CH_2)_nY$. Y is substituted for the sulfur in thiourea (1) to form the isothiouronium salt (3).

Non-limiting examples of the leaving group, Y, include a protonated hydroxide group, an amino group, an alkoxide group, a fluoride, a chloride, a bromide, an iodide, a methyl sulfate group, a methanesulfonate (mesylate) group, a trifluoromethanesulfonate (triflate) group, a 4-methanebenzenesulfonate (tosylate) group, a dialkylether group, a nitrate group, a phosphate group, an ammonium group, an inorganic ester group, a carboxylate group, a phenoxide group, or an amide group.

Figure 2:
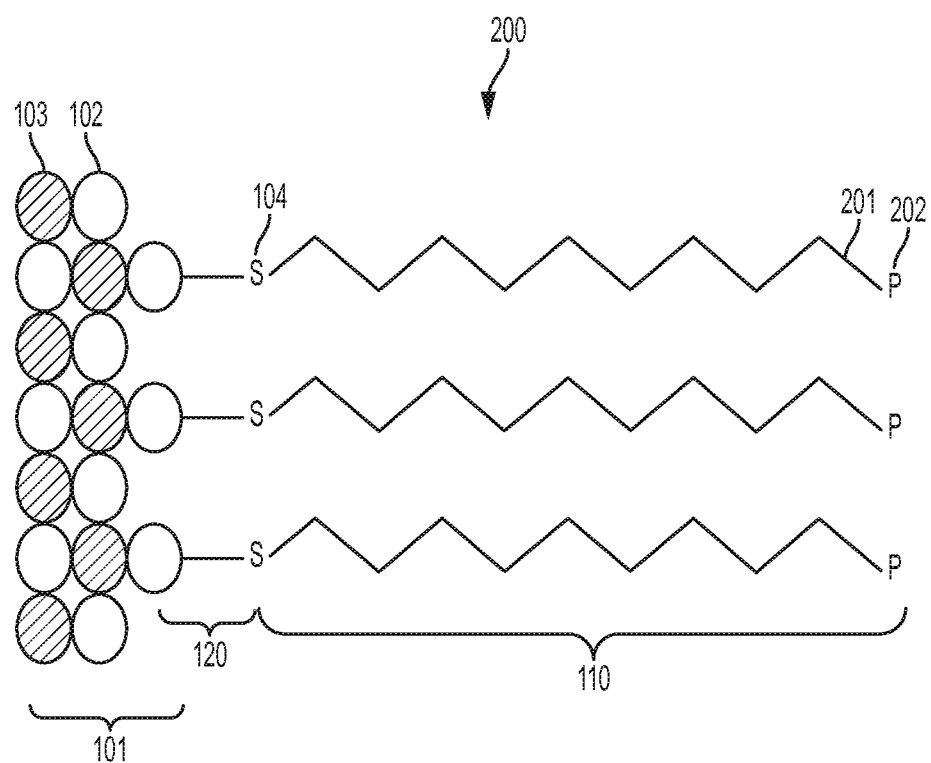
FIG. 2 is a schematic diagram of a polymer bonded to the coupling agent.

To form the coupling agent, as shown in Scheme 2 below, the isothiouronium salt (3) is then hydrolyzed with any basic compound (4) to provide the reactive thiol (5) that, after being deprotonated to form a thiolate, can form the disulfide bond 120 with zinc sulfide surface 101 as shown in FIGS. 1 and 2. In the isothiouronium salt (3), n is an integer from about 2 to about 18. The terminal alkene group 111 bonds with the polymer 202 and becomes an unsaturated single bond 201, as shown in FIG. 2.

Scheme 2

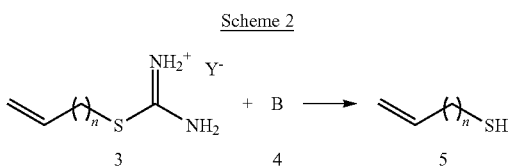

Any of the above described isothiouronium salts can be hydrolyzed and bonded to a zinc sulfide surface 101 and a polymer 202 of interest. The base or basic compound (4) can be any compound, reactant, or solution with a pH value sufficient to hydrolyze the isothiouronium salt. For example, the pH of the base or basic compound (4) can be greater than 7. Non-limiting examples of the base or basic compound (4) include a carbonate compound, a hydroxide compound, a cyanide compound, a borate compound, a phosphate compound, a pyrophosphate compound, a sulfite compound, a sulfide compound, or any combination thereof. The base or basic compound (4) can be a silicate of an alkali metal, including sodium, potassium, lithium, rubidium and cesium; a carbonate compound, a hydroxide compound, a cyanide compound, a borate compound, or a sulfide of ammonia; an alkoxide of an alkali metal; a quaternary ammonium hydroxide, or any combination thereof.

One advantage of using an isothiouronium salt to form the coupling agent 110 is that it provides a protective group, the charged isothiouronium group that allows for formation of the disulfide bond 120 when desired or appropriate.

The isothiouronium salts may be first reacted with the polymer 202 (described in FIG. 2) to form an isothiouronium salt-polymer conjugate. The isothiouronium salt-polymer conjugate may then hydrolyzed with a base and then disposed onto the zinc sulfide surface 101 to form a disulfide bond 120. However, the isothiouronium salt-polymer conjugate may be first disposed onto the zinc sulfide surface 101 and then hydrolyzed with a base at high pH to form the disulfide bond 120. Alternatively, the isothiouronium salt can be first hydrolyzed and disposed onto the zinc sulfide surface 101 to form a disulfide bond 120. Then, the isothiouronium salt bonded to the zinc sulfide surface 101 can be hydrolyzed with a base and then reacted with the polymer 202.

The coupling agents 110 may be prepared by any method or procedure. In one non-limiting example, isothiouronium salts may be prepared by reacting thiourea and the corresponding compound having an appropriate leaving group, such as $CH_2(CH_2)_nY$, in an inert, polar, organic solvent (e.g., ethanol) at a temperature of from about 50 to about 80° C. for about 4 to 6 hours. If a precipitate forms upon cooling, it may be filtered and recrystallized from ethanol. If no precipitate forms upon cooling, then the ethanol is removed by rotary evaporation and the residue is employed without further purification.

FIG. 2 is a schematic diagram of a polymer 202 bonded to the coupling agent 110. The alkene group 111 shown in FIG. 1 reacts with and bonds to the polymer 202 and becomes a saturated single bond 201 (alkane group). The polymer 202 and the coupling agent 110 form a coating on the zinc sulfide surface 101. The polymer 202 forms a hydrophobic surface on the zinc sulfide surface 101. Like the coupling agent 110 and the zinc sulfide surface 101, the polymer 202 is also optically transparent in the LWIR region.

The polymer 202 may be a homopolymer or a copolymer. The polymer 202 is formed by polymerizing monomeric units that are optically transparent. The polymer 202 includes a chain and/or group that reacts with alkene group 111. In some embodiments, the polymer 202 only includes carbon and hydrogen. In other embodiments, the polymer 202 may include other substituents or groups that are also transparent in the LWIR region. The polymer 202 does not include, for example, nitrogen groups/atoms, oxygen groups/atoms, or halogen groups/atoms. However, in some embodiments, the polymer 202 may include sulfur groups/atoms. The thickness of the layer forming the polymer 202 may generally vary and depends on the type of polymer and the target application.

In one exemplary embodiment, the polymer 202 is formed from polymerization of norbornene (bicycle[2.2.2]hept-2-2-ene). Norbornene has the following structure:

In another exemplary embodiment, the polymer 202 is formed from polymerization of isobutylene. Isobutylene has the following structure:

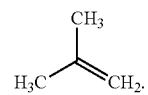

Yet, in other embodiments, the polymer 202 includes an aliphatic hydrocarbon, including but not limited to, polyethylene, polypropylene, polycyclopentadiene, or any combination thereof.

The order in which the zinc sulfide surface 101, the coupling agent 110, and the polymer 202 are combined may vary. For example, the coupling agent 110 may be first reacted with the zinc sulfide surface 101 to form the disulfide bond 120, and then the polymer 202 can be reacted with the coupling agent 110. Alternatively, the coupling agent 110 and polymer 202 may be combined and reacted to form a coupling agent-polymer conjugate, and the coupling agent-polymer conjugate can be reacted with the zinc sulfide surface 101. For example, the coupling agent 110 can be reacted with the polymer 202 to form a zinc-sulfide reactive polymer before attaching the zinc-sulfide reactive polymer to the zinc sulfide surface 101.

The optically transparent coupling agents 110 reacts with the zinc sulfide surface 101 to provide a LWIR transparent substantially non-polar surface. The modified zinc sulfide surface may then be used to provide robust adherent interactions between transparent polymers and zinc sulfide. The transparent polymeric coatings provide improved mechanical properties, stability and protection from handling damage.

The disulfide-forming transparent coupling agents 110 improve various properties of the zinc sulfide surface 101. For example, when the coupling agent 110 is bonded to the zinc sulfide surface 101, the adhesion strength between the polymer 202 and the zinc sulfide is greater than an untreated, like zinc sulfide surface without the coupling agent. The coupling agent also improves polymer wetting of the zinc sulfide surface 101.

In contrast to other coupling agents that may use an oxygen-containing group to pair with organic coatings and are thus not transparent in the LWIR region, the described coupling agents 110 and polymers 202 are optically transparent in the LWIR region. Thus, they provide the potential to improve the characteristics of zinc sulfide optical elements by adding an organic coating without compromising the optical properties.

As described above, disclosed herein is a coating that includes a coupling agent that forms a disulfide bond with the zinc sulfide surface and includes a hydrocarbon compound functional group that covalently bonds with an organic polymer. Hydrocarbon functional groups do not absorb in the LWIR region of interest. The coating is thus an adhesion promoter that is transparent in the LWIR region. The coatings can be paired with a variety of optical surfaces. For example, the coatings can be used on lenses, optical windows, sensors, detectors, domes, beam splitters, and other like optical surfaces. The coatings improve the mechanical properties and stability of transparent zinc sulfide. The coatings also protect the zinc sulfide from handling damage and do not interfere with the optical properties.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A optical element, comprising:
    a surface comprising a zinc sulfide layer;
    a coupling agent adhered to the zinc sulfide layer by a disulfide bond and comprising a hydrocarbon tail extending from the disulfide bond; and
    a polymer bonded to the hydrocarbon tail of the coupling agent by a covalent bond;
    wherein the polymer and the coupling agent are optically transparent in the long wavelength infrared (LWIR) region.

2. The optical element of claim 1, wherein the optical element is a lens, an optical window, a sensor, a detector, a dome, or a beam splitter.

3. The optical element of claim 1, wherein the zinc sulfide layer comprises cubic ZnS that is transparent in the LWIR region.

4. The optical element of claim 1, wherein the hydrocarbon tail of the coupling agent is an alkyl chain.

5. The optical element of claim 1, wherein the hydrocarbon chain of the coupling agent is an alkenyl chain.

6. The optical element of claim 1, wherein the LWIR region includes wavelengths of about 8 to about 12 microns.

7. The optical element of claim 1, wherein the coupling agent does not include nitrogen or oxygen.

8. An optical element, comprising:
    a surface comprising a zinc sulfide layer;
    a coupling agent bonded to the zinc sulfide layer by a disulfide bond and comprising a saturated hydrocarbon tail with about 2 to about 20 carbons extending from the disulfide bond; and
    a polymer bonded to the hydrocarbon tail of the coupling agent by a covalent bond;
    wherein the polymer and the coupling agent are optically transparent in the long wavelength infrared (LWIR) region of about 8 to about 12 microns.

9. The optical element of claim 8, wherein the coupling agent does not include halogens.

10. The optical element of claim 8, wherein the coupling agent of the coating consists essentially of carbon and hydrogen.

11. The optical element of claim 8, wherein the polymer of the coating consists essentially of carbon and hydrogen.

12. The optical element of claim 8, wherein the polymer is derived from polymerization of norbornene or isobutylene.

13. A method of making an optical element, the method comprising:
    forming a surface comprising a zinc sulfide layer;
    bonding a coupling agent to the zinc sulfide layer by a disulfide bond, the coupling agent comprising a hydrocarbon tail extending from the disulfide bond; and
    bonding a polymer to the hydrocarbon tail of the coupling agent to form a coating that is optically transparent in the long wavelength infrared (LWIR) region of about 8 to about 12 microns.

14. The method of claim 13, wherein the coupling agent includes a terminal alkene group that bonds to the polymer and forms an alkane between the hydrocarbon tail and the polymer.

15. The method of claim 13, further comprising treating an isothiouronium salt with a basic compound to form the coupling agent.

16. The method of claim 15, further comprising reacting thiourea with a compound having the following formula: $CH_2(CH_2)_nY$ to form the isothiouronium salt;
    wherein Y is a protonated hydroxide group, an amino group, an alkoxide group, a fluoride, a chloride, a bromide, an iodide, a methyl sulfate group, a mesylate group, a triflate group, a tosylate group, a dialkylether group, a nitrate group, a phosphate group, an ammonium group, an inorganic ester group, a carboxylate group, a phenoxide group, or an amide group.

17. The method of claim 15, wherein the isothiouronium salt has the following structure:

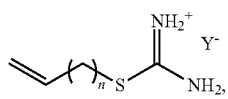

and n is an integer from 2 to 18, and Y is an anion.

18. The method of claim 13, wherein the coupling agent has the following structure before bonding to the zinc sulfide layer and the polymer:

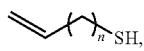

and n is an integer from about 2 to about 18.

19. The method of claim 15, wherein the isothiouronium salt has the following structure:

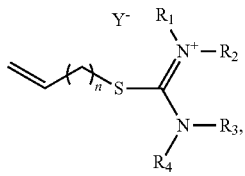

and $R_1$, $R_2$, $R_3$, and $R_4$ are each independently a hydrogen, an alkyl chain, an alkenyl chain, an alkynyl chain, or an aryl chain; $Y^-$ is an anion that can form a salt with a isothiouronium group; and n is an integer from about 2 to about 18.

20. The method of claim 13, wherein the optical element is a lens, an optical window, a sensor, or a detector.

* * * * *